(12) United States Patent
Browning

(10) Patent No.: US 8,827,176 B2
(45) Date of Patent: Sep. 9, 2014

(54) HVOF TORCH WITH FUEL SURROUNDING OXIDIZER

(71) Applicant: James A. Browning, Lebanon, NH (US)

(72) Inventor: James A. Browning, Lebanon, NH (US)

( * ) Notice: Subject to any disclaimer, the term of this patent is extended or adjusted under 35 U.S.C. 154(b) by 0 days.

(21) Appl. No.: 13/652,817

(22) Filed: Oct. 16, 2012

(65) Prior Publication Data

US 2014/0008454 A1  Jan. 9, 2014

Related U.S. Application Data

(60) Provisional application No. 61/668,078, filed on Jul. 5, 2012.

(51) Int. Cl.
*F02D 1/06* (2006.01)
(52) U.S. Cl.
USPC .................. 239/5; 239/8; 239/13; 239/132.3; 239/405; 239/424
(58) Field of Classification Search
CPC ........ F02M 53/043; F23D 14/78; B05B 7/06; B05B 7/10
USPC ........ 239/5, 8, 13, 132–132.3, 403–406, 423, 239/424–425
See application file for complete search history.

(56) References Cited

U.S. PATENT DOCUMENTS

| | | | | |
|---|---|---|---|---|
| 3,685,740 A | * | 8/1972 | Shepherd | 239/400 |
| 3,980,233 A | * | 9/1976 | Simmons et al. | 239/400 |
| 4,508,054 A | * | 4/1985 | Baumberger et al. | 118/718 |
| RE33,464 E | * | 11/1990 | Gitman | 432/13 |
| 6,095,436 A | * | 8/2000 | Seegers et al. | 239/403 |
| 6,277,323 B1 | | 8/2001 | Bissonnette | |
| 6,383,445 B1 | | 5/2002 | Anderson et al. | |
| 7,628,606 B1 | | 12/2009 | Browning | |
| 8,327,643 B2 | * | 12/2012 | Yamamoto et al. | 60/743 |
| 8,544,545 B2 | * | 10/2013 | Prentice, III | 166/272.3 |

\* cited by examiner

*Primary Examiner* — Christopher Kim
(74) *Attorney, Agent, or Firm* — Michael J. Weins; Jeffrey E. Semprebon

(57) ABSTRACT

HVOF torches introduce fuel and oxidizer reactants into a central passage so as to form a concentric stream having an axial stream of oxidizer surrounded by an annular stream of fuel that is positioned against a sidewall that bounds the central passage. The fuel can be introduced so as to swirl about the axial stream of oxidizer. The torch can be formed by a body having the central passage therethrough and an insert residing in the central passage and having an oxidizer passage therethrough. A portion of the insert can have a reduced cross section so as to form an annular fuel chamber, from which the flow of fuel into a passage first section is restricted so as to distribute the fuel against the sidewall. The torch can be provided with a cooling jacket to prevent damage to the body.

4 Claims, 6 Drawing Sheets

HVOF TORCH WITH FUEL SURROUNDING OXIDIZER

FIELD OF THE INVENTION

The present invention relates to high-velocity oxidizer-fuel (HVOF) torches such as are used for thermal spraying of coatings, impact spraying of coatings, and flame cutting.

BACKGROUND OF THE INVENTION

Applicant's U.S. Pat. No. 7,628,606 teaches a high-velocity oxidizer-fuel (HVOF) torch that employs a stratified stream of oxidizer and fuel reactants to stabilize combustion. The oxidizer is introduced in a vortex constrained in the bore of the torch, and the fuel is introduced axially into a low pressure eye of the oxidizer. The unreacted oxidizer surrounding the combustion gases shields the bore from damage if the bore length is maintained sufficiently short. When a longer bore length is desired, a coolant jacket can be provided around the bore.

It has been observed that for torches of the '606 patent, the hottest region of the exiting flame jet is in a ring due to the outwardly-expanding flame as the reactants pass through the bore of the torch. This limits the effectiveness of the torches in melting high-temperature coating materials that are introduced along the axis of the bore as a powder entrained in the fuel stream.

SUMMARY OF THE INVENTION

The present invention is for a high-velocity oxygen-fuel (HVOF) thermal spray torch and a method of thermal spraying; the torch and method may, in some cases, also be suitable for flame cutting. Central to the operation of the torch and the method is the introduction of the reactants in two concentric streams, with the fuel being introduced so as to surround a central stream of the oxidizer. Introducing the fuel surrounding the oxidizer is felt to provide more efficient combustion and a more concentrated flame jet along a central axis of the torch, since the flame is believed to initiate at the interface between the oxidizer and fuel and expand inwards towards the central axis as the reactants progress through a bore of the torch.

The torch has a cylindrical body terminating in a distal end and a proximal end, the body having a central passage therethrough that is symmetrically disposed about a central axis. The central passage has a passage first section, which is bounded by a passage sidewall and terminates in a torch exit that defines the distal end, and a passage second section, which continues the central passage from the first section and terminates at the proximal end. The body has a body fuel port for introducing a gaseous fuel from a conventional supply into the passage second section via a fuel passage.

Means for introducing the fuel from the passage second section into the passage first section in an annular distribution positioned against said passage sidewall are provided. In some embodiments, the fuel passage intersects the passage second section in a tangential manner, causing the fuel to swirl within the central passage so as to be constrained against the passage sidewall when the fuel enters the passage first section.

In other embodiments, an insert resides at least partly in the passage second section and is configured so as to form, in combination with the cylindrical body, an annular chamber within the passage second section. The insert is configured so as to introduce the fuel into the passage first section in an annular manner such that the fuel is distributed adjacent to the passage sidewall that bounds the passage first section. In some of these embodiments, the insert is further configured to impart a swirling action to the fuel.

An oxidizer port is provided, which connects to a source of oxidizer and to an oxidizer passage. The oxidizer passage in turn is configured to introduce the oxidizer into the passage first section along the central axis, creating a concentric stream of reactants in the passage first section, with the fuel located against the passage sidewall and the oxidizer extending along the central axis. When an insert is employed, the oxidizer passage can be provided through the insert, extending along the central axis. The insert can be further configured to receive the oxidizer from the oxidizer port in a tangential manner to create a swirling action of the oxidizer before it is introduced along the central axis. When the fuel is also swirled, the swirl of the oxidizer can be either in same direction or opposite to the direction of the swirling fuel.

A cooling jacket can sealably engage the cylindrical body so as to substantially surround the passage first section. In such cases, a coolant inlet port and a coolant outlet port are provided so that coolant can be passed through the cooling jacket.

The above described torch is well suited for practicing the method of the present invention. The method comprises providing a central passage that extends along a central axis to terminate at a distal end and in a proximal end region. Fuel and oxidizer reactants are introduced into the central passage in the proximal end region in such a manner as to create a concentric stream having a central stream of the oxidizer surrounded by a surrounding stream of the fuel distributed in an annular space about the oxidizer. The reactants are allowed to pass down the central passage to exit at the distal end, and are ignited as they exit from the distal end.

When the central passage is configured with a length L, measured along the central axis from the location at which the fuel is introduced to the distal end, and a diameter D selected such that the ratio L:D is greater than about 3:1, the method should also include passing a coolant around the central passage so as to prevent damage from excessive heating. When such a cooling is performed, it may be practical to employ a liquid such as kerosene as the fuel; however, the use of a liquid fuel may place greater limitations compared to a gaseous fuel on the structure required to introduce the fuel so as to obtain an annular distribution about the central oxidizer stream. One approach to achieving an annular distribution is to introduce the liquid via a continuous annular gap. The use of liquid fuel may also complicate ignition of the reactants, requiring the use of a spark plug or similar ignition means.

The use of a gaseous fuel places fewer restrictions on the introduction of the fuel, as the gaseous fuel expands; this allows the fuel to be introduced through one or more discrete passages, and such passages can be readily configured to swirl the fuel as it is introduced. Similarly, the oxidizer can be provided by a suitable gas such as oxygen and can also be swirled before its introduction along the central axis. When the fuel is swirled in one direction and the oxidizer swirled in the opposite direction, this may increase the rate of mixing.

When a gaseous fuel is employed, the torches of the present invention can be operated in combination with means for controlling the pressures of the input streams such as are known in the art. It has been found that, by varying the pressures of the reactants, the character of the resulting flame can be changed to suit the desired application. A remarkable result that has been observed is that the use of a concentric stream with central oxidizer surrounded by fuel allows the proportions of fuel and oxidizer to be varied over a wide range while still maintaining stable combustion, allowing the proportions of the reactants to be adjusted to provide a flame temperature and velocity suitable for the desired application. A low-temperature flame may be most suitable for impact fusion, since high velocity is maintained, while a high-temperature flame may be most suitable for use spraying melted powder or wire.

When the temperature is low, the powder particles strike a workpiece surface in their solid state to form a nearly oxide-free coating in what has been called "impact fusion" for high melting point materials such as molybdenum, and "cold spray" for low melting point metals such as aluminum, zinc, and copper. Currently, cold gases are used for "cold spray"; burners operating with compressed air as the oxidizer are employed for "warm spray"; and oxygen-fuel burners are employed for high-temperature materials. Thus, in the prior art, different systems have been required for cold spraying and for spraying where the powder or wire is melted before depositing it onto a workpiece.

DETAILED DESCRIPTION OF THE PREFERRED EMBODIMENTS

Figure 1:
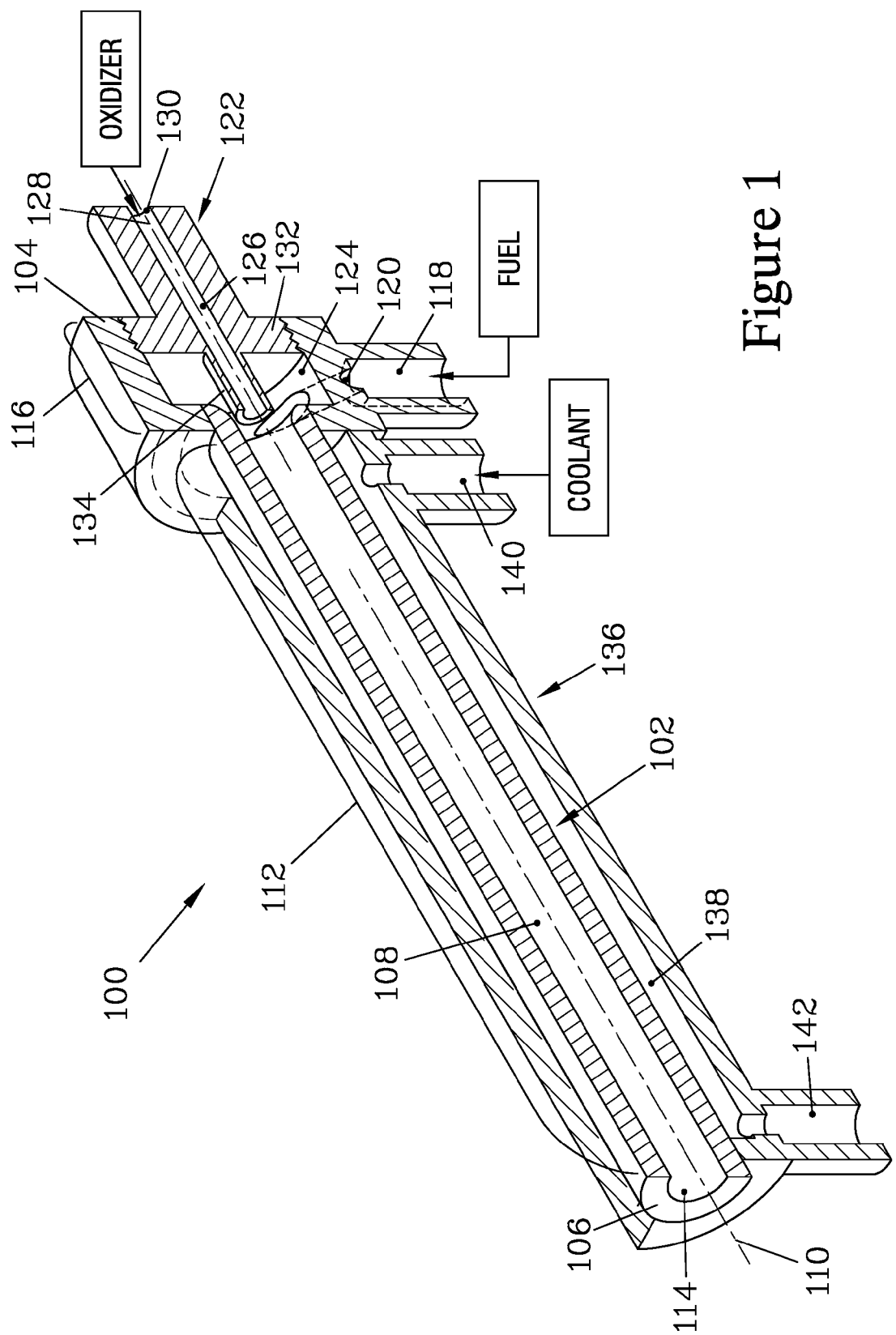
FIG. 1 is a sectioned isometric view showing one embodiment of the present invention, a HVOF torch having a cylindrical body with a central passage, an insert residing in a section of the central passage, and a cooling jacket surrounding a portion of the cylindrical body. The insert forms an annular chamber within the central passage into which fuel is introduced via a fuel port in the cylindrical body. The fuel port of this embodiment introduces the fuel in a tangential manner to provide a swirling action. The insert has an oxidizer passage that is centered on an insert axis which in turn is coincident with a central axis about which the central passage is symmetrical; thus, the oxidizer is introduced into a low-pressure central eye formed by the swirling fuel.

FIG. 1 is a sectioned isometric view illustrating a high-velocity oxidizer-fuel (HVOF) torch 100 that forms one embodiment of the present invention. The torch 100 has a cylindrical body 102 terminating at a proximal end 104 and a distal end 106, and having a central passage 108 extending therebetween along a central axis 110. The central passage 108 has a passage first section 112, which terminates in a torch exit 114 at the distal end 106 and is symmetrical about the central axis 110, and a passage second section 116, which joins the passage first section 112 and terminates at the proximal end 104.

A body fuel port 118 supplies fuel from a conventional supply to a fuel passage 120 that in turn introduces the fuel into the passage second section 116; the torch 100 is particularly well suited for use with a gaseous fuel. In the torch 100, the fuel passage 120 is directed tangentially with respect to the cross section of the passage second section 116, and thus introduces the gas in an off-center manner so as to create a swirling flow of fuel, as discussed in greater detail below.

An insert 122 engages in the passage second section 116 and is sealably attached to the cylindrical body 102. The insert 122 is configured such that the insert 122 and the passage second section 116, in combination, form an annular chamber 124 within the passage second section 116, into which the fuel passage 120 introduces the fuel. The insert 122 has an oxidizer passage 126 therethrough that resides on an insert axis 128 of the insert 122; the insert axis 128 is coincident with the central axis 110. The oxidizer passage 126 communicates with an oxidizer port 130 which introduces oxidizer from a conventional supply, the oxidizer passage 126 directing the oxidizer into the central passage 108. In the torch 100, the oxidizer passage 126 extends through an insert first section 132, which is configured to sealably engage the passage second section 116, and through an insert second section 134 which extends the oxidizer passage 126 beyond the insert first section 132. The insert second section 134 has a reduced cross section so as to form the annular chamber 124 between the insert second section 134 and the passage second section 116. The extension of the oxidizer passage 126 provided by the insert second section 134 serves to introduce the oxidizer into the passage first section 112.

Because the fuel is introduced tangentially, it swirls within the annular chamber 124 about the insert second section 134 so as to create a swirling flow about the central axis 110 before the fuel enters the passage first section 112. In the torch 100, the passage first section 112 has a reduced cross section compared to the passage second section 116, the swirling stream of fuel is narrowed as it enters the passage first section 112, creating a vortex flow along the passage first section 112. This vortex flow has a region of reduced pressure along the central axis 110, and the oxidizer passage 126 is positioned to introduce the oxidizer axially into this low pressure eye to create a stratified stream of reactants in the passage first section 112, having a central region of oxidizer surrounded by the swirling fuel. These reactants mix in a region where the fuel and oxidizer meet, and when the stream exiting the torch exit 114 is ignited, the flame resides predominantly in this mixed region.

Due to the efficient mixing and combustion of the reactants, the flame within the passage first section 112 is extremely hot, and may require external cooling to prevent damage to the cylindrical body 102. In the torch 100, a coolant jacket 136 is sealably attached to the cylindrical body 102 so as to form an annular coolant chamber 138 extending around the portion of the cylindrical body 102 that contains the passage first section 112. The coolant jacket 136 has a coolant inlet 140 and a coolant outlet 142 that can be connected to a conventional supply of coolant such as water.

The resulting high temperature of the flame along the central axis facilitates melting of high-melting point coating materials. These materials could be readily introduced in the form of a powder that is included in the stream of oxidizer as it is supplied through the oxidizer port so as to be distributed in the vicinity of the central axis where the flame is hottest.

Figure 2:
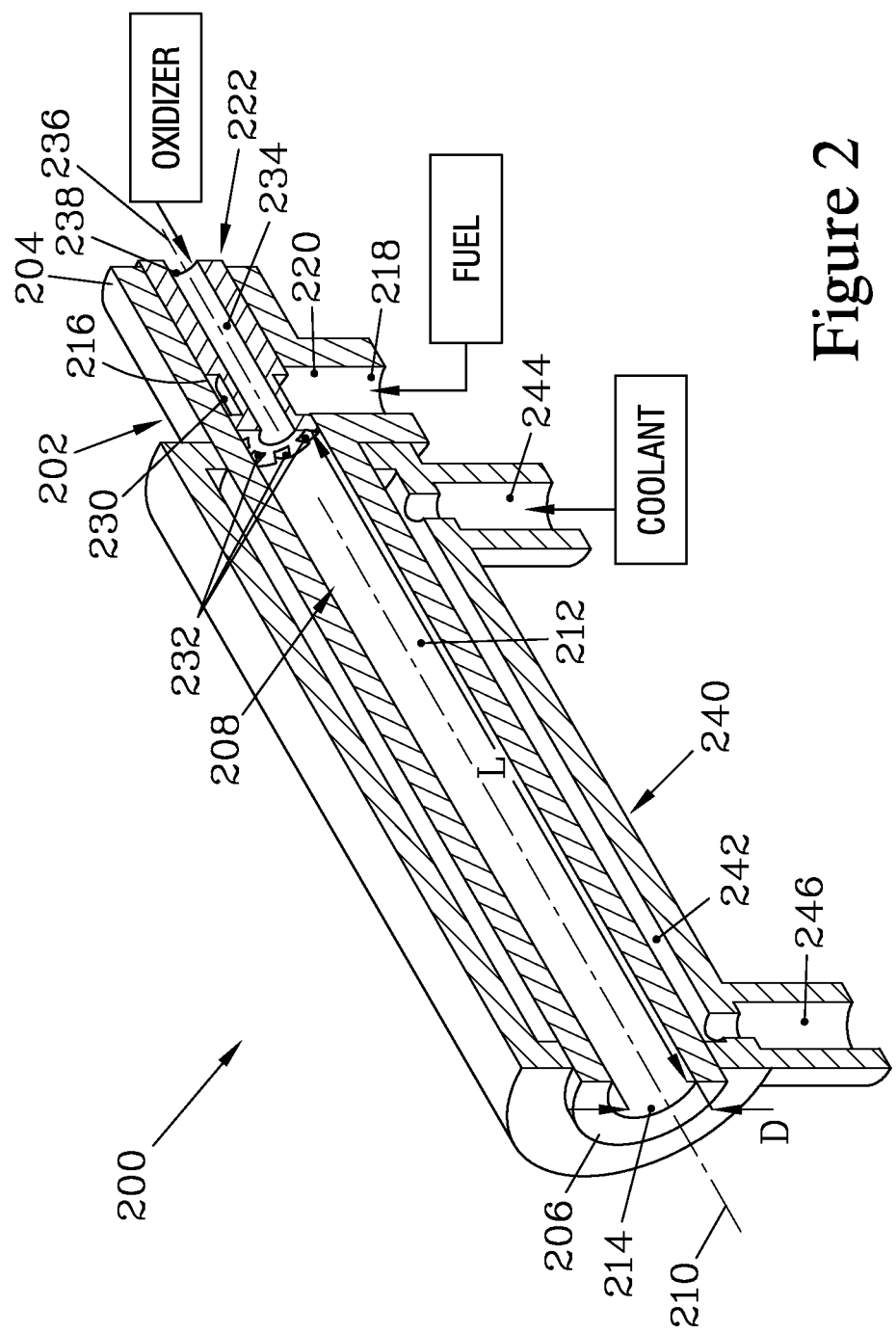
FIG. 2 is a sectioned isometric view of a HVOF torch that forms another embodiment of the present invention. In this embodiment, the fuel port directs the fuel radially inwards, and the insert is configured to provide slanted passages to swirl the fuel as it passes from an annular chamber into the central passage for mixing with the oxidizer.
Figure 3:
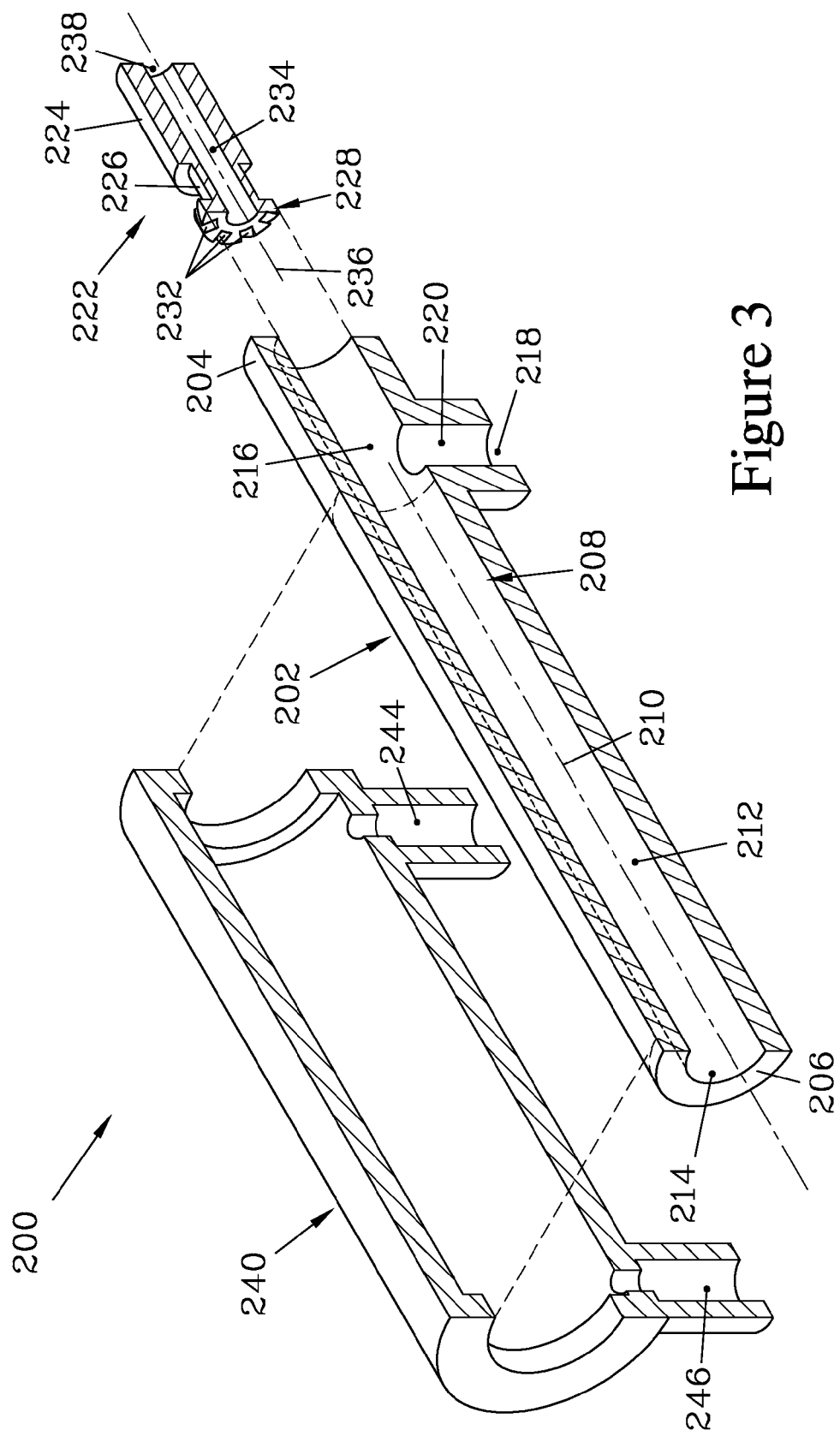
FIG. 3 is an exploded view of the torch shown in FIG. 2 to better illustrate the three major components.

FIGS. 2 and 3 illustrate a HVOF torch 200 that forms another embodiment of the present invention. Compared to the torch 100 discussed above, the torch 200 provides a simpler structure that should be easier to fabricate.

The torch 200 again has a cylindrical body 202 terminating at a proximal end 204 and a distal end 206, with a central passage 208 extending along a central axis 210 and having a passage first section 212 terminating in a torch exit 214 and a passage second section 216 terminating at the proximal end 204. A body fuel port 218 introduces fuel to a fuel passage 220 that communicates with the passage second section 216. In this embodiment, the fuel passage 220 does not impart a swirl to the fuel as it is introduced into the passage second section 216, but rather the fuel is swirled by an insert 222.

The insert 222 sealably attaches to the cylindrical body 202 so as to be positioned in the passage second section 216. As better shown in FIG. 3, the insert 222 of this embodiment has an insert first section 224, an insert second section 226 that attaches to the insert first section 224, and an insert third section 228 that attaches to the insert second section 226. The insert first section 224 is configured to sealably engage the passage second section 216, while the insert second section 226 has a reduced cross section so as to form an annular chamber 230 (shown in FIG. 2) between the insert second section 226 and the passage second section 216. The fuel passage 220 is positioned to introduce the fuel into this annular chamber 230. The insert third section 228 of this embodiment is configured to engage the passage second section 216 and terminates at the passage first section 212. The insert third section 228 is provided with a radial array of fuel-swirling notches 232 that communicate between the annular chamber 230 and the passage first section 212. As illustrated, these notches 232 are inclined with respect to the central axis 210 so as to generate a swirl as the fuel passes through them from the annular chamber 230 into the passage first section 212.

The insert 222 also has an oxidizer passage 234 that extends along an insert axis 236 that is coincident with the central axis 210. The oxidizer passage 234 communicates with an oxidizer port 238 and extends through the insert sections (224, 226, 228) so as to introduce the oxidizer into the passage first section 212, into a reduced pressure region of the swirling flow of fuel formed by the passage of the fuel through the fuel-swirling notches 232.

The portion of the cylindrical body 202 that contains the passage first section 212 is surrounded by a coolant jacket 240 to form an annular coolant chamber 242 (shown in FIG. 2) through which coolant can be passed from a coolant inlet 244 to a coolant outlet 246 to prevent damage to the cylindrical body 202 due to excessive heating resulting from combustion of the fuel and oxidizer. It has been found that such external cooling is typically needed when the ratio of the passage first section length L to its diameter D is such that L:D is greater than about 3:1. If the body is sufficiently short that the ratio of L:D is less than about 3:1, the torch may not require water cooling; this, combined with the short length, can allow fabrication of compact torches suitable for spraying inside confined spaces.

As shown in the exploded view of FIG. 3, the torch 200 can be formed from three basic components, the cylindrical body 202, the insert 222, and the coolant jacket 240. Each of these components can be readily machined and subsequently assembled and sealed together, such as by soldering.

Figure 4:
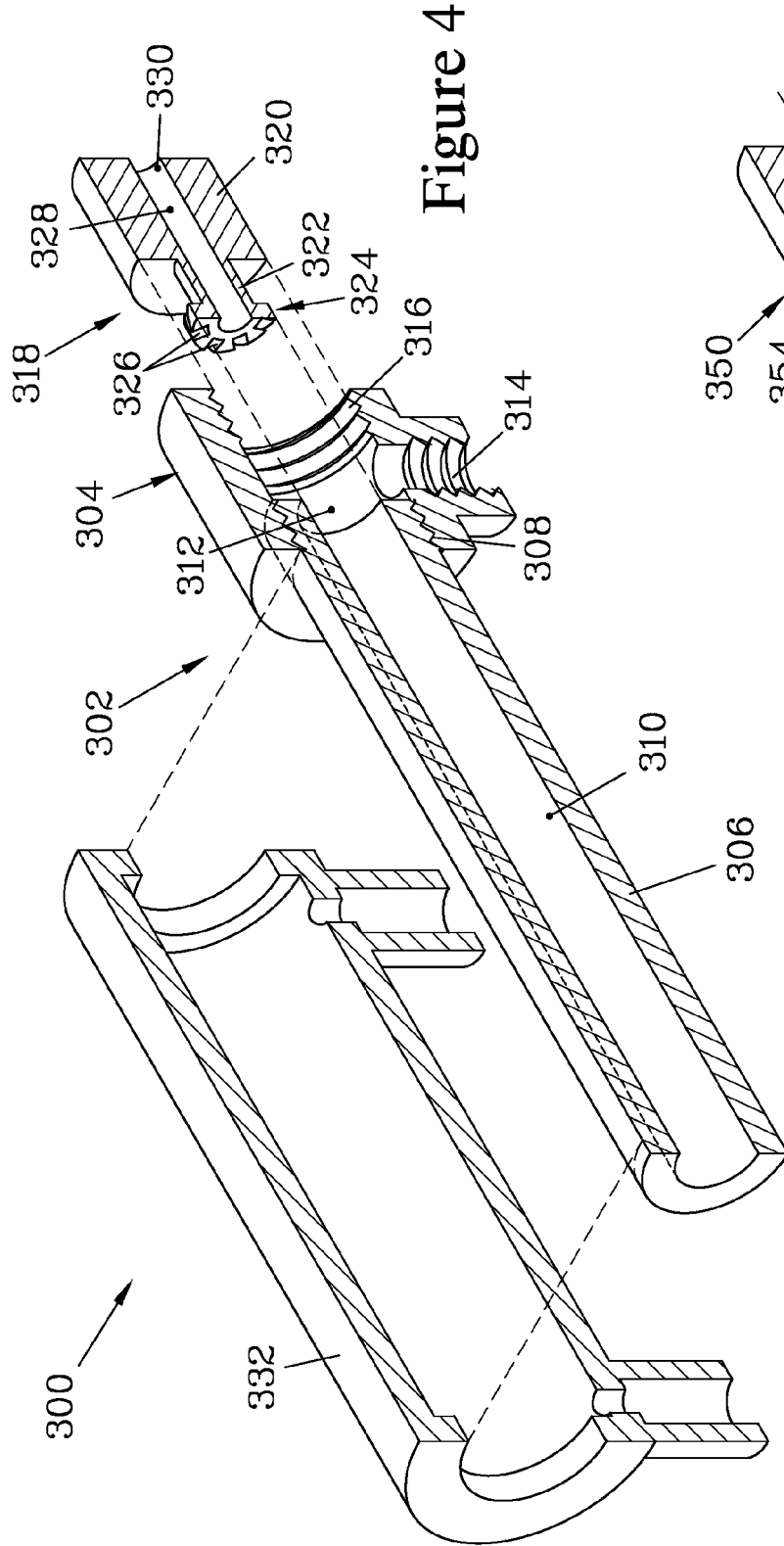
FIG. 4 is an isometric view of a HVOF torch that forms another embodiment of the present invention. This torch is functionally similar to that shown in FIGS. 2 and 3, but differs in its structure so as to allow the cylindrical body to be formed from commercially available parts to simplify fabrication.

While the torch 200 shown in FIGS. 2 and 3 can be readily fabricated, greater ease of fabrication can result from employing conventional stock parts to form a portion of the torch. FIG. 4 illustrates a HVOF torch 300 that is functionally similar to the torch 200 discussed above, but which has a torch body 302 formed from a commercially available T-block 304 and threaded tube 306. The T-block 304 has a first threaded opening 308 into which the threaded tube 306 is installed. The threaded tube 306 provides a passage first section 310 in the torch body 302, while the free interior space of the T-block 304 provides a passage second section 312. A second threaded opening 314 in the T-block 304 serves as a fuel port for introducing fuel into the passage second section 312, while a third threaded opening 316 is open to receive an insert 318.

The insert 318 is a readily-machined part that has an insert first section 320 that slidably installs into the third threaded opening 316 and can be sealed thereto such as by soldering. The insert 318 also has an insert second section 322 with a reduced cross section that forms an annular chamber (not shown) within the passage second section 312, and an insert third section 324 that is configured to slidably insert into the threaded tube 306 so as to reside in the passage first section 310. The insert third section 324 is provided with an array of fuel-swirling notches 326 that communicate between the annular chamber and the passage first section 310 to impart a swirling motion to the fuel. The insert 318 has an oxidizer passage 328 therethrough to introduce oxidizer from an oxidizer port 330 to the passage first section 310.

The threaded tube 306 is surrounded by a cooling jacket 332, which is similar to the coolant jacket 240 discussed above.

Figure 5:
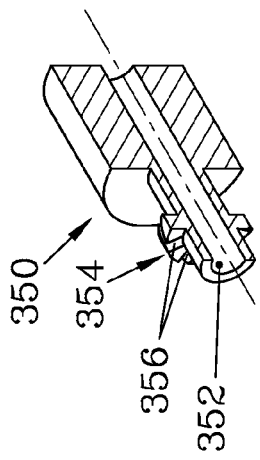
FIG. 5 is an isometric view showing an alternative insert that can be employed in the torch shown in FIG. 4. This insert provides an extended passage for introducing the oxidizer into the outer flow of fuel.

FIG. 5 is an illustration of an alternative insert 350 that could be employed in the torch 300 in place of the insert 318. The insert 350 has an extended oxidizer passage 352 that extends from an insert third section 354 so as to introduce the oxidizer at a location further along the passage first section (310 shown in FIG. 4) than the location where fuel is introduced through an array of fuel-swirling notches 356 provided in the insert third section 354.

When a gaseous fuel is employed, a similar insert could be formed with notches that are not inclined, but rather extend parallel to the central axis, and thus do not swirl the fuel. In this case, the extended oxidizer passage introduces the oxidizer into the central passage at a location axially separated from the notches, where the gaseous fuel that has passed through the notches has expanded so as to form a substantially continuous annular distribution.

In the embodiments discussed above, the oxidizer is introduced axially into the low pressure eye formed by the swirling fuel. In such cases, the speed of mixing can be adjusted to some degree by adjusting the relative pressures of the fuel and the oxidizer.

Figure 6:
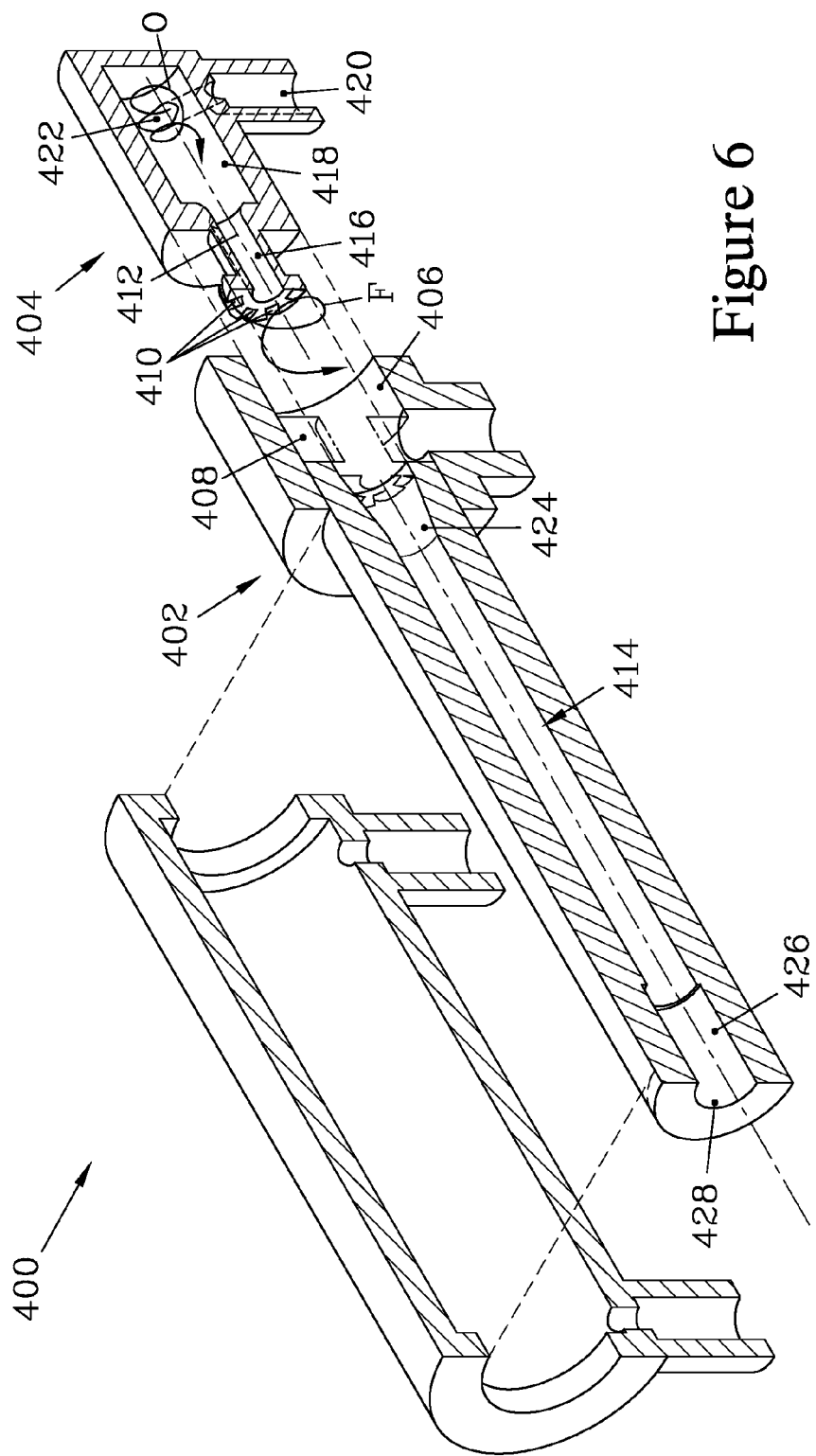
FIG. 6 is an isometric view of a HVOF torch that forms another embodiment of the invention. In this embodiment, the oxidizer is introduced through a tangential passage to swirl it in a direction opposite the swirl of the fuel. These counter-rotating vortices result in enhanced mixing of the fuel and oxidizer reactants.

FIG. 6 illustrates a HVOF torch 400 that serves to swirl the oxidizer in a direction opposite that of the fuel, which may increase the rate of mixing under some operating conditions.

The torch 400 has a cylindrical body 402 that is functionally similar to the cylindrical body 302 of the torch 300 discussed above. An insert 404 is installed into a passage second section 406 in the cylindrical body 402, and is configured to form an annular chamber 408 into which the fuel is introduced. The insert 404 is provided with fuel-swirling notches 410 that are inclined with respect to an insert axis 412 so as to impart a swirling motion to the fuel as it passes from the annular chamber 408 into a passage first section 414. In the torch 400, the inclination of the fuel-swirling notches 410 is such that the swirling action of the fuel is counterclockwise when viewed from the passage first section 414 towards the passage second section 406, as indicated by the arrow F.

The insert 404 of this embodiment has an oxidizer passage 416 that extends along the insert axis 412 to a cylindrical oxidizer chamber 418. The oxidizer chamber 418 in turn communicates with an oxidizer port 420 via an oxidizer-swirling passage 422 that introduces the oxidizer into the oxidizer chamber 418 in a tangential manner. The tangential direction of the oxidizer-swirling passage 422 imparts a swirling motion to the oxidizer that is clockwise when viewed from the passage first section 414 towards the passage second section 406, as indicated by the arrow O, and thus is opposite the direction of the swirling fuel. This swirling flow of oxidizer is passed into and through the oxidizer passage 416 such that the oxidizer is swirling opposite to the fuel when introduced into the passage first section 414 of the cylindrical body 402.

The passage first section 414 of this embodiment is smaller in diameter than the passage second section 406 along most of its length, and has a first section tapered segment 424 to provide a smooth transition with the passage second section 406. The first section tapered segment 424 allows the depth of the fuel-swirling notches 410 to be increased while providing sufficient space between the introduced fuel and the oxidizer introduced along the insert axis 412 to provide a stratified stream as the reactants are introduced. The passage first section 414 also has a first section enlarged terminal segment 426 extending to a torch exit 428. This enlarged segment adjacent to the torch exit has been found to facilitate ignition of the exiting reactants in many situations; both the tapered segment and the enlarged segment are felt to be beneficial for other embodiments as well.

Figure 7:
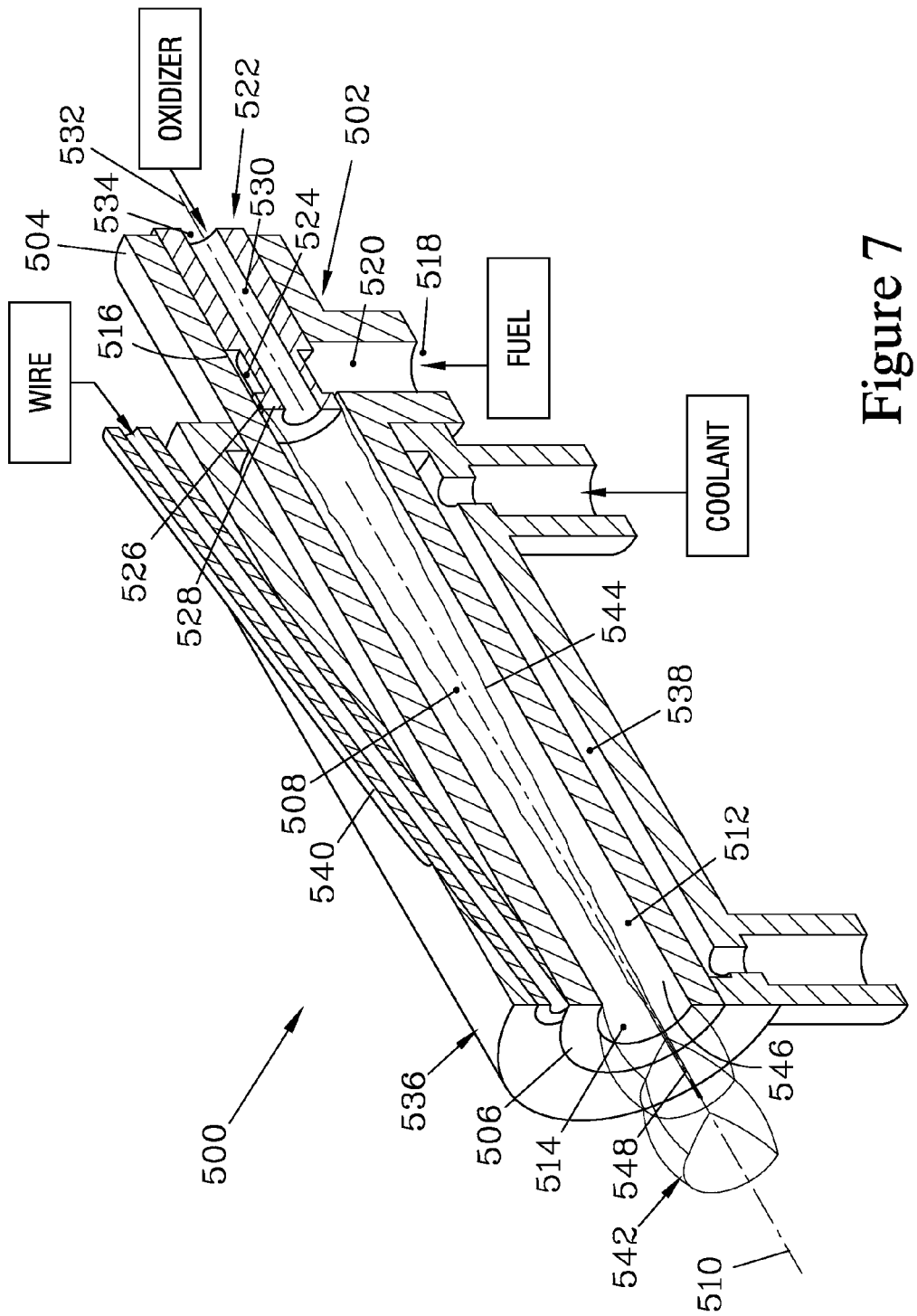
FIG. 7 is an isometric view of a torch that is similar to that shown in FIGS. 2 and 3, but where the fuel is not swirled. The fuel is introduced into an annular chamber formed by the insert, and the insert is configured to form an annular injection space for introducing the fuel into the passage first section against a passage sidewall that bounds the passage first section. This embodiment also includes a wire passage for introduction of a wire coating material to be sprayed by the torch; the wire passage extends through the cooling jacket so as to position the wire at the torch exit.

FIG. 7 is a sectioned isometric view of a HVOF torch 500 that has a structure with many similarities to the torch 200 shown in FIGS. 2 and 3, but which does not impart a swirl to the fuel. The torch 500 again has a cylindrical body 502 that terminates at a proximal end 504 and a distal end 506, the cylindrical body 502 having a central passage 508 that extends along a central axis 510. The central passage 508 again has a passage first section 512 terminating in a torch exit 514 at the distal end 506 and a passage second section 516 terminating at the proximal end 504.

A body fuel port 518 communicates with the passage second section 516 via a fuel passage 520, and an insert 522 that resides in the passage second section 516 forms an annular chamber 524 within the passage second section 516. The fuel passage 520 introduces the fuel into the annular chamber 524, from which it is in turn introduced into the passage first section 512 via an annular injection space 526. The insert 522 is formed with an injection disk 528 that has a diameter somewhat less than that of the passage second section 516, forming the annular injection space 526 therebetween. While not shown, the passage first section could be formed with a tapered section that helps maintain the distribution of fuel against the passage sidewall so that the reactants are introduced as a stratified stream.

The insert 522 also has an oxidizer passage 530 that extends along an insert axis 532 that is coincident with the central axis 510, the oxidizer passage 530 communicating with an oxidizer port 534 to introduce the oxidizer into the passage first section 512 along the central axis 510.

The portion of the cylindrical body 502 that contains the passage first section 512 is surrounded by a coolant jacket 536 to form an annular coolant chamber 538. In the torch 500, a wire passage 540 extends through the annular coolant chamber to allow a wire of coating material (not shown) to be inserted into a flame 542 exiting the torch exit 514. Those skilled in the art should appreciate that other conventional techniques for introducing a material to be coated could be employed, such as by introducing a powdered material into the oxidizer as discussed above with regard to the embodiment shown in FIG. 1.

When the ratio of length to diameter (L:D) of the passage first section 512 is greater than about 3:1, as illustrated, thereby requiring the coolant jacket 536 to avoid overheating, the torch 500 can be made suitable for use with a liquid fuel such as kerosene. The annular injection space 526 is felt to be particularly suitable for introducing a liquid fuel, as it can be sized to provide a continuous annular distribution of the fuel stream without relying on expansion of the fuel. While a continuous annular distribution might alternatively be attained by swirling a liquid fuel, the relatively small volume flow of fuel typically employed may make it difficult to establish a sufficient swirling flow to provide a continuous distribution in most situations.

FIG. 7 also shows a representation of a flame front 544 that is believed to be generated by the torch 500. Because the fuel is introduced through the annular injection space 526 in close proximity to a passage sidewall 546, the fuel initially mixes with the oxidizer for combustion in a region located near the sidewall 546. The resulting combustion gases expand inwards, causing an inward advance of the flame front 544 as it progresses through the passage first section 512 towards the torch exit 514. If the length of the passage first section 512 is properly selected, the flame front 544 forms an extending flame lance 548 of white-hot flame extending from the torch exit 514.

The torches of the present invention are felt to be particularly effective for applications where it is desired to generate the hottest portion of the flame in the central region of the stream of combusting reactants. Because the fuel is introduced in an annular flow surrounding the oxidizer, mixing occurs at the interface between the oxidizer and fuel and combustion initially takes place in this region. As combustion continues while the reactants travel through the passage first section, the expanding flame works inwards towards the center of the flow. This results in the mixing and combustion occurring last towards the center, and thus this region is hottest when the flame exits the central passage. This has benefits in many applications, such as when high-melting point materials are introduced as powder along the central axis entrained in the oxidizer flow.

Other than providing an intense mixing action of the reactants by use of counter-rotating fuel and oxidizer reactants, the nature of such rapid mixing results in highly increased combustion reactions. This fast combustion allows the use of much shorter bore length-to-diameter (L:D) ratio than earlier torches such as taught in the '606 patent. For example, a torch according to the '606 patent using an outer oxygen vortex together with a non-whirling central fuel flow requires the use of a 4-inch heating bore length for a ⅜ inch diameter bore, thus having an L:D ratio over 10:1. By use of counter-rotating whirling flows of fuel and oxidizer, such as shown in FIG. 6, L:D ratios of as low as 2:1 are possible at no reduction in the mass flows of the reactant gases. It is felt to be remarkable that the reactant flows remain constant for a given bore diameter;

however, the character of the exit flames beyond the torch exit change greatly. For the case of a ⅜ inch diameter bore of 4 inches, an extremely high-velocity supersonic flame jet is formed, having a velocity that may be as high as 4,000 ft/sec. The supersonic portion of the jet itself is about ½ inch in diameter at its maximum width. For a torch of the present invention having an L:D ratio of 2:1, for the same mass flow of reactants, the outer diameter of the exiting jet expands to about ¾ inch. The jet temperature, however, is about 1,000° F. or more above that of the high-velocity torch. The visual appearance of the flame resembles the flames typical of flame spraying rather than those of typical HVOF torches. Thus, the L:D ratio can be selected for the desired operation. Maximum impact velocity of solid particles against a workpiece for solid impact or impact fusion requires the use of relatively high L:D ratios. Such high L:D ratios may be unable to melt many of the high-melting point materials, in which case torches having a low L:D ratio, and thus a higher temperature capable of melting such material to form liquid droplet impact particles should be employed. The present invention extends the flame spray process into high-velocity applications, as the torches can produce jet velocities in the range of twice that of "open" flames currently employed in flame spraying, which depend on an outer sheath of expanded compressed air to accelerate the particles. Other advantages of the present invention include greatly increased spray rates and eliminating the need for large amounts of compressed air as used by conventional flame spraying.

It is felt that the ability of torches having an L:D ratio as low as 2:1 to ignite and stabilize such a large flow mass of reactants may be due to the vortex flows of the fuel and oxidizer resulting in a longer path for mixing before exiting the bore of the torch when these reactants are introduced tangentially. For example, a ⅜ inch diameter bore has a circumference of over 1 inch, so if the fuel and the oxidizer swirl five times before exiting, they would experience 5 inches of travel within the bore, providing sufficient length of flow to allow complete mixing.

An important result of the outside position of the fuel flow against the sidewall of the central passage is the increased heating of the body of the torch. Employing an L:D ratio of greater than about 3:1 requires the use of water cooling for typical body materials such as copper. A relative bore length less than about 3:1 L:D ratio results in an acceptable amount of heating of the body without water cooling. This, in combination with the reduced bore length, allows the construction of very small torches for use in confined spaces. For example, a torch having a ⅜ inch diameter bore has been tested with a body only ¾ inch diameter and 1 inch long, having a bore length of ¾ inch for a L:D ratio of 2:1.

The torches of the present invention are well suited to practice the method of the present invention as discussed above in the Summary of the Invention. The method of the present invention allows operation over a wide temperature range and can be used to apply deposits of various melting-point materials by varying the operating parameters. For a medium to high oxygen flow range, the fuel flow can be reduced to the point that the supersonic exit jet is not visible in a normally lighted room. The jet momentum remains extremely high, but will not melt an aluminum wire.

Adding more fuel causes the torch to pass into the warm spray mode, and reaching the stoichiometric level of the reactants brings the torch into the high temperature range. For the lean combustion case, oxygen serves as the diluent in place of nitrogen, $CO_2$, or even quench water. At 150 psi operating pressure of the oxygen for the low temperature case, the jet velocity remains above 3,000 ft/sec, which is more than enough to raise impacting solid particles to the known critical velocity range of over 500 meters/second.

A strange, but beneficial, result occurs when the fuel gas flow is greatly increased above its theoretical value for complete combustion. The continued presence of un-combusted oxygen, together with the dissociated products CO, OH and O continue to burn within the supersonic jet itself. A bright flame forms an inch, or so, downstream of the bore exit. It may stretch up to a couple of inches along the jet. The result is a strong boost in the heating of wire or powder passing along the jet path. This concentrated flame may also be suitable for flame cutting applications.

Operating an HVOF torch in a fuel-rich mode has been found beneficial in improving the quality of metallic coatings, since the excess fuel exiting the torch reacts with oxygen in the surrounding air to reduce oxides in the coating. The torch of the present invention can be operated with a higher proportion of fuel than has been found possible with earlier torches in order to spray higher quality metallic coatings.

Examples

Preliminary testing of examples of torches of the present invention show that these torches perform significantly differently from torches employing an oxidizer vortex, such as taught in U.S. Pat. No. 7,628,606. Most notably, torches of the present invention appear to have the hottest portion of the flame concentrated on the central axis, rather than in close proximity to the passage sidewall, as found in torches of the '606 patent. Furthermore, under some operating conditions the torches of the present invention appear to provide higher flame temperatures, and in some cases a greatly increased spray rate of a coating material. For all examples discussed below, propane was employed as the fuel and oxygen as the oxidizer.

Example 1

High Flame Temperature

A torch having a structure similar to that shown in FIGS. 2-3 was made having the passage first section 7 inches long and ⅜ inch diameter over most of its length, after a tapered section in front of the insert. The insert had three slots for introducing the fuel and the oxidizer passage through the insert was 3/16 inch diameter. This torch was initially found difficult to ignite, and the end was felt to be too hot in operation. Reducing the length to 6 inches solved the overheating issue, and reaming the torch exit to a diameter of 7/16 inch diameter made it easier to ignite, although still not as easy to ignite as torches employing an oxidizer vortex such as taught in the '606 patent.

This torch was found to form shock diamonds in the exiting jet that were visibly different from those resulting from torches of the '606 patent, appearing somewhat more rounded, and it appeared that the temperature of the exit jet was higher. When an aluminum wire was introduced into the exiting flame, the resulting spray burned white hot for a distance of about 3 inches out from the point of atomization of the wire. While the flame was too hot for spraying aluminum, it is felt that it might be suitable for spraying high temperature materials such as chromium or ceramic materials.

Comparison of Spray Rate

Example 2

A torch having a structure similar to that shown in FIGS. 2-3 was made having the passage first section 12 inches long and 3/8 inch diameter, and the oxidizer passage about 3/16 inch diameter. This torch was found to spray stainless steel wire at an estimated rate of 40 lbs/hour for 3/32 inch diameter stainless steel wire. For comparison, a torch according to U.S. Pat. No. 7,628,606 was formed having the passage first section 4 inches long and 3/8 inch diameter. This torch was found to spray stainless steel wire at an estimated rate of 40 lbs/hour for 1/8 inch diameter stainless steel wire, the same rate as for the torch Example 2 when spraying 3/32 inch diameter wire. While no 1/8 inch diameter was available for testing with the torch of Example 2, extrapolating from the result for the smaller wire indicates that a spray rate of about 53 lbs./hour should be obtained using 1/8 inch diameter wire, about a 30% increase over the rate of the '606 torch having the same bore diameter.

Example 3

Similarly, a torch having an insert similar to that shown in FIG. 7 was made having the passage first section 12 inches long and 3/8 inch diameter over most of its length, after a tapered section in front of the insert, and with the oxidizer passage through the insert 3/16 inch diameter. This torch was found to spray stainless steel wire at an estimated rate of 35 lbs/hr for 3/32 inch diameter wire, and up to 45 lbs/hr of 1/8 inch wire. This represents about a 10-15% increase compared to the torch of the '606 patent discussed under Example 2.

Example 4

Practical Compact Torch

A torch was formed having a structure similar to that shown in FIG. 1, with the fuel introduced tangentially through a 3/32 inch diameter fuel passage, and introducing the oxidizer via a 3/16 inch diameter oxidizer passage along the central axis. This torch did not employ a coolant jacket, and was made having the passage first section 1 inch long and 3/8 inch diameter (an L:D ratio of about 2.7:1). This torch became red hot at the torch exit when operated, indicating a higher temperature than desired for the torch body. The length of the passage first section was reduced to 5/8 inch (L:D ratio of about 1.7:1), and no indication of excessive heating was observed. Thus, while it is possible to operate torches of the present invention without additional cooling at L:D ratios below about 3:1, it may be preferable to reduce the L:D ratio to no more than about 2:1 to maintain the torch body at a practical temperature.

At both passage lengths, this torch resulted in a stable flame but without shock diamonds in the exit jet. In comparison, it has been found that torches of the '606 patent require a length of bore that provides an L:D ratio of at least about 10:1 to obtain relatively complete combustion of the reactants. For a 3/8 inch diameter torch, a torch of the '606 patent having a minimum L:D ratio of 10:1 would need to have a passage first section about 4 inches long.

In addition to the specific examples discussed above, it was found that several torches of the present invention had the ability to vary the flame character by adjusting the relative reactant pressures, when burning gaseous fuel and oxygen. Starting with a torch operating in a stoichiometric or somewhat fuel-rich condition, where the exit flame was observed to have a white-hot central core about 1/8 inch diameter extending out a few inches from the torch exit, the fuel pressure could be reduced while maintaining the oxygen pressure constant. Operation was stable while the fuel could be reduced to the point where the exit flame was barely visible, and the flame was too cool to melt an aluminum wire held in the exit flame. However, the velocity of the exit jet was felt to be sufficiently high as to be suitable for spraying powdered coating materials.

While the novel features of the present invention have been described in terms of particular embodiments and preferred applications, it should be appreciated by one skilled in the art that substitution of materials and modification of details can be made without departing from the spirit of the invention.

What I claim is:

1. A method for producing a supersonic flame jet stream from a torch for heating and spraying a coating material onto a substrate, the method comprising the steps of:
providing a central passage terminating at a distal end and in a proximal end region, the passage being bounded by a passage sidewall and extending along a central axis, the central passage having a diameter D and a length L measured along the central axis from the location at which the fuel is introduced to the distal end, where the length L is selected such that the ratio L:D is less than 3;
introducing fuel and oxygen, reactants, into the proximal end region of the central passage so as to form a concentric stream of reactants having a central stream of oxygen advancing along the central axis and a surrounding stream of fuel that is distributed about the central stream of oxygen, the fuel being introduced so as to contact the passage sidewall upon introduction,
wherein the fuel is a gaseous fuel and the fuel stream is swirled about the central axis as it is introduced into the central passage;
allowing the reactants to pass through the central passage and exit at the distal end, thereby allowing the reactants to mix as they progress through the central passage,
the passage sidewall being configured to block radially outward expansion of the fuel to maintain the fuel against the sidewall as the fuel and oxygen initially mix, resulting in a mixed region of fuel and oxygen that expands radially inwards as the fuel and oxygen pass along the central passage toward the distal end of the passage; and
igniting the mixed reactants exiting the passage to generate a supersonic flame jet resulting from progressive mixing and combustion of the reactants within the passage, the supersonic flame jet extending beyond the distal end.

2. The method of claim 1 wherein the oxygen stream is swirled about the central axis.

3. The method of claim 2 wherein the oxygen stream is swirled in a direction about the central axis opposite to that of the fuel.

4. The method of claim 2 wherein the ratio L:D is less than 2:1.

\* \* \* \* \*